United States Patent
Badger et al.

(10) Patent No.: US 8,059,436 B2
(45) Date of Patent: Nov. 15, 2011

(54) MODULAR POWER CONVERTERS USABLE ALONE OR IN A MULTIPHASE POWER CONVERTER

(75) Inventors: Christopher Samuel Badger, Waitsfield, VT (US); Kiran Kumar Kulihithalu Channakeshava, Essex, VT (US); Shazreen Meor Danial, West Hartford, CT (US); Stephen Paul Hoskins, Waterbury Center, VT (US); Jeffrey K. Petter, Williston, VT (US)

(73) Assignee: Northern Power Systems, Inc., Barre, VT (US)

( * ) Notice: Subject to any disclaimer, the term of this patent is extended or adjusted under 35 U.S.C. 154(b) by 468 days.

(21) Appl. No.: 11/952,805

(22) Filed: Dec. 7, 2007

(65) Prior Publication Data

US 2008/0174966 A1   Jul. 24, 2008

Related U.S. Application Data

(60) Provisional application No. 60/869,026, filed on Dec. 7, 2006.

(51) Int. Cl.
*H02M 1/00* (2007.01)
(52) U.S. Cl. ...................................... 363/144
(58) Field of Classification Search .......... 363/40, 363/44–46, 144, 146; 361/709, 728–730, 361/818
See application file for complete search history.

(56) References Cited

U.S. PATENT DOCUMENTS

| 6,735,097 | B1 | 5/2004 | Prasad et al. |
| 6,850,426 | B2 * | 2/2005 | Kojori et al. ................. 363/123 |
| 7,371,963 | B2 * | 5/2008 | Suenaga et al. ............... 136/205 |
| 2002/0071301 | A1 | 6/2002 | Kinghorn |
| 2003/0218887 | A1 | 11/2003 | Kojori et al. |
| 2004/0145919 | A1 | 7/2004 | Hazucha |
| 2005/0169327 | A1 | 8/2005 | Eden et al. |
| 2006/0000967 | A1 | 1/2006 | Kuijk et al. |
| 2006/0245216 | A1 | 11/2006 | Wu et al. |

OTHER PUBLICATIONS

FIGS. 1-12 which correspond to FIGS. 2-12 of U.S. Appl. No. 60/869,026, filed Dec. 7, 2006.

* cited by examiner

*Primary Examiner* — Matthew Nguyen
(74) *Attorney, Agent, or Firm* — Downs Rachlin Martin PLLC

(57) ABSTRACT

A power converter module for use alone or with other modules in a multiphase power converter. The power converter module has an enclosure that surrounds internal components to prevent radiation of electromagnetic energy, which internal components also limit conduction of electromagnetic energy. The internal components include an EMI filter, a ripple filter, a power converter, and a control interface that communicates with a control system of a power conversion system. The control interface includes a memory that stores information related to the power converter modules so as to improve interchangability of similar power modules with the multiphase power converter.

18 Claims, 6 Drawing Sheets

(12) United States Patent

US 8,059,436 B2

MODULAR POWER CONVERTERS USABLE ALONE OR IN A MULTIPHASE POWER CONVERTER

RELATED APPLICATION DATA

This application claims the benefit of priority of U.S. Provisional Patent Application Ser. No. 60/869,026, filed Dec. 7, 2006, and titled Modular Power Electronic Converter System and Method Thereof, which is incorporated by reference herein in its entirety.

FIELD OF THE INVENTION

The present invention generally relates to the field of electrical power converters. In particular, the present invention is directed to a modular power converter and a multiphase power converter system having a group of modular power converters.

BACKGROUND

Power converters, such as three-phase power converters, used to convert an input current or voltage to an output current or voltage typically include complex construction that results in large, unwieldy devices. Known multiphase power converters often include complex circuitry designed in accordance with a specified application.

It is known to break multiphase power converters into discrete modules, one for each phase of output current. Unfortunately, the known modularized designs proposed suffer from one or more drawbacks that limit their full potential. These drawbacks include (i) conduction and radiation of electromagnetic energy that causes electromagnetic interference with adjacent power converter modules and other electronic equipment, (ii) multiple power and control wiring connections that can be challenging to connect due to space constraints, expertise and other factors, (iii) the need for custom engineering services using PhD or other high skill-set engineering talent to design and/or source components used with the modules, such as filters and inductor networks.

SUMMARY OF THE DISCLOSURE

In one implementation, a power converter module usable with a control system is provided. The power converter module includes a power converter for converting an input into an output having a single phase; a control interface connected to the power converter and configured for connection to the control system; a first filter for filtering out first components from the output; a second filter for filtering out second components from the output; and an enclosure surrounding the power converter, the control interface, the first filter and the second filter.

In another implementation, a power converter module is provided. The power converter module includes a power converter for converting one of (a) an input into a single phase output and (b) one phase of a multiphase input into an output; and a control interface connected to the power converter and configured for connection to a control system. The control interface includes nonvolatile memory for storing information regarding the history of operation and other attributes of the power converter module.

In still another implementation, a multiphase power converter system for converting an input to an output having a plurality of phases is provided. The system includes a control system; a plurality of power converter modules connected to the control system, one for each of the plurality of phases. Each of the plurality of power converter modules has: a power converter for converting an input into an output having one phase of a plurality of phases, a control interface connected to the power converter and the control system, a first filter for filtering out first components from the output current, a second filter for filtering out second components from the output current, and an enclosure surrounding the power converter, the control interface, the first filter and the second filter.

In yet another implementation, a power converter is provided. The power converter includes circuitry for converting an input to an output having different electrical characteristics; at least one heat sink thermally coupled with the circuitry; and a connection coupling the heat sink to a ground, the connection including a resistance.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
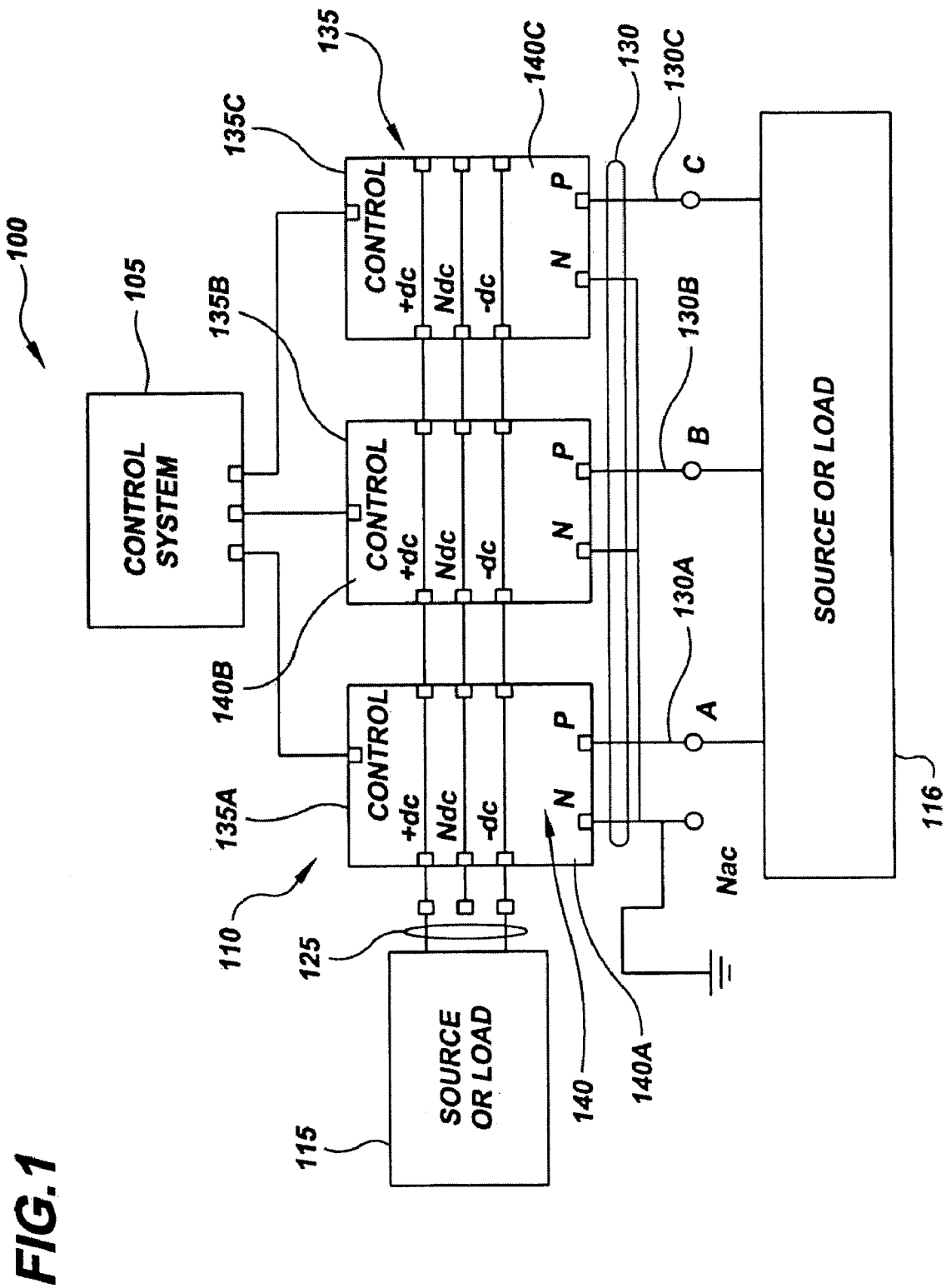
FIG. 1 is a schematic diagram of a multiphase power converter system having a plurality of power converter modules, each for converting an input to one phase of a multiphase output.

Referring now to the drawings, FIG. 1 illustrates a power conversion system 100 that includes a control system 105 in communication with a multiphase power converter 110. "Multiphase," as this term is used in connection with multiphase power converter 110, refers to the top-level phases in output current or voltage, e.g., the three phases in a traditional three-phase power system, and not subphases (sometimes also referred to as staggered phases or interleaved phases) within a given phase. Multiphase power converter 110 is connected between a load or source 115 that receives or provides a single phase input on line 125 and a load or source 116 that receives or provides a multiphase output on line 130. As discussed more below, power converter modules 135 are bidirectional, and so their direction of operation will influence whether elements 115 and 116 are sources or loads. For convenience of discussion, and without limiting the manner in which power converter modules 135 operate, the current and voltage carried on line 125 is generally referred to as an input and the current and voltage carried on line 130 will generally be referred to as an output. In all cases, the voltage of the phase output on line 130 will fall between the positive and negative voltage inputs on line 125.

Multiphase power converter 110 includes a plurality of power converter modules 135, e.g., modules 135A-C, which may be used alone or in the multiphase power converter, as discussed more below. While power converter modules 135 may be of any size, they typically have greater applicability when larger than 1 kW. Each power converter module 135 includes module circuitry 140, e.g., module circuitry 140A-C, that generates either one phase of a multiphase output or a single phase output. For example, as illustrated in FIG. 1, power converter modules 135 A-C each provide an output that constitutes one phase of a three-phase output. Although multiphase power converter 110 is illustrated in FIG. 1 with three power converter modules 135A-C (i.e., one power converter module for each phase of the output on line 130), it is contemplated that the multiphase power converter may have any number of power converter modules 135, one or more for each phase of the output, as desired. In some cases it will be desirable to connect two or more power converter modules 135 in parallel for a given phase of output. Further, and as discussed in more detail in connection with FIGS. 2A and 2B below, it is contemplated that module circuitry 140 is designed in a manner to permit the individual power converter modules 135 to operate alone in power conversion system 110 or with other power converter modules in a multiphase power converter 110 in a number of different configurations. These configurations include, for example, a bi-directional three-phase inverter, a bi-directional three-phase rectifier, a bi-directional buck converter, a bi-direction boost converter, a single phase converter (e.g., a dc-dc converter), and a multiphase power converter, among others.

Figure 2A:
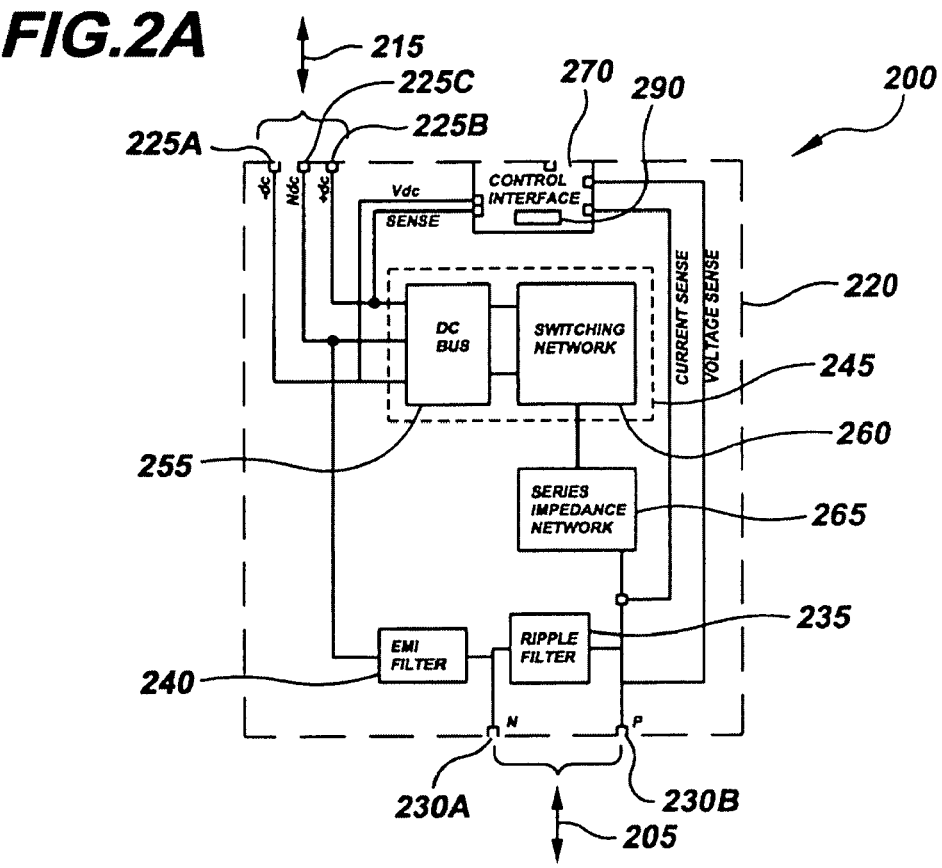
FIG. 2A is a schematic diagram of one implementation of a power converter module of the type used in the multiphase power converter system of FIG. 1.
Figure 2B:
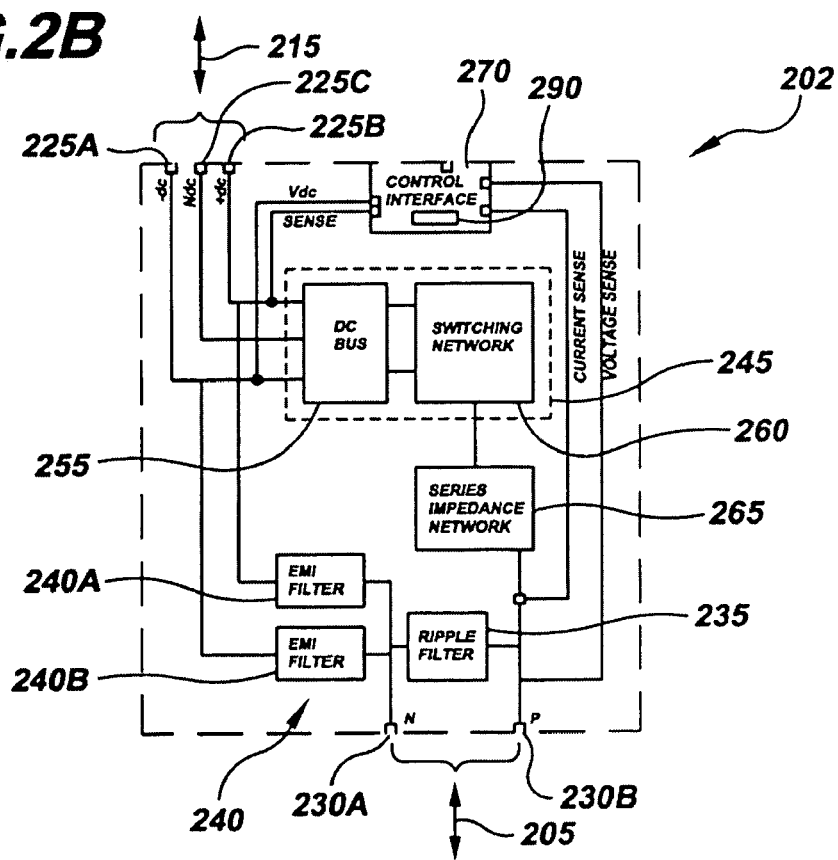
FIG. 2B is a schematic diagram of an alternative implementation of a power converter module of the type used in the multiphase power converter of FIG. 1.

FIGS. 2A and 2B illustrate implementations of power converter modules 200 and 202, respectively, in accordance with concepts of the present invention for use alone or in multiphase power converter 110 (FIG. 1). In particular, power converter modules 200 and 202 illustrate in more detail examples of components that may be included in power converter modules 135. As such, modules 200 and 202 may be used in multiphase power converter 110 wherever modules 135 are illustrated. Because modules 200 and 202 are essentially identical, the description provided below for module 200 also applies for module 202, except for certain differences in EMI filtering that are discussed below, and so a separate description for module 202 is not provided.

Power converter modules 200 and 202 are configured to provide a single phase output 205 in response to an input 215. As discussed above, the terms "output" and "input" are used here for convenience, as modules 200 and 202 are bidirectional, and so the current or voltage at 205 may be an input and the current or voltage at 215 may be an output.

Power converter module 200 includes an enclosure 220 that surrounds the various components and internal circuitry of the power converter module discussed below. In general, enclosure 220 is constructed in a manner that blocks radiation of the various forms of interference, e.g., ripple current frequencies (typically 1 kHz to 100 kHz) and EMI frequencies (typically higher than ripple current frequencies), generated by such components and circuitry within the confines of the enclosure. Various materials, such as, for example, steel and aluminum, may be used in the construction of enclosure 220 to provide sufficient interference protection and also provide a sufficiently ruggedized enclosure to safely support the contents thereof in the intended operating environments.

Power converter module 200 includes input nodes 225A-C that receive input 215 and output nodes 230A and 230B through which single phase output 205 may be transmitted to a load (not shown). When input 215 is a DC current or voltage, input nodes 225A-C may function as a positive node 225A, a negative node 225B and a neutral node 225C. In certain cases it may be desirable to omit or not make a connection with node 225B. Output node 230A will function as a neutral node and output node 230B will function as a phase node. In many cases, it will be desirable to locate input nodes 225A-C and output nodes 230A and B within enclosure 220 to contain interference. The added benefits that result from the placement of the nodes within enclosure 220 as illustrated in FIG. 2A (and FIGS. 2B, 3, and 4) will be discussed more below.

Power module 200 also includes a ripple filter 235 and an EMI filter 240 that are connected to filter the output provided at nodes 230A and B before reaching the nodes. In one implementation, as shown in FIG. 2A, ripple filter 235 is designed and connected to filter out first components from the output provided to nodes 230A and 230B. Typically, these components are frequencies in the range 1 kHz to 100 kHz. Ripple filter 235 generally includes a capacitor in parallel with other circuit elements, e.g., inductors, other capacitors and resistors. Similarly, EMI filter 240 is designed and connected to filter out second components from the output provided to nodes 230A and 230B, generally radio frequencies. These second components typically have a higher frequency than the first components filtered by ripple filter 235, although some overlap may exist. In its simplest form, EMI filter 240 is a capacitor, and in other implementations, resistances and other capacitors may be added. In power converter module 200 illustrated in FIG. 2A, EMI filter 240 is connected between neutral node 225C and neutral node 230A.

Other implementations of power module 200 in accordance with concepts of the present disclosure will feature other connection schemes for EMI filter 240. In power converter module 202 illustrated in FIG. 2B, EMI filter 240 is implemented with a two-part configuration, i.e., EMI filter 240A and 240B. EMI filter 240A is connected between node 225B and node 230A and EMI filter 240B is connected between node 225A and node 230B. In any event, it is desirable to attach EMI filter 240 to ground, either directly or through other EMI filters. With the exception of this difference in EMI filter 240, power converter modules 200 and 202 are identical. Thus, the following discussion of features in module 200 pertain also to module 202.

Connections in known power converters for the input and the output are often positioned outside of the enclosure of the power converters. As mentioned above and illustrated in FIGS. 2A and 2B, in power converter modules 200 and 202 it will often be desirable to position these connection points, i.e., input nodes 225A-C and output nodes 230A and B, inside of enclosure 220 in a manner that minimizes the conduction and radiation from the enclosure of high-frequency components emitted by these nodes. Such design enhancements will reduce electromagnetic interference with adjacent ones of power converter modules 200 or 202 present in a multiphase power converter 110 including power converter modules 200 or 202, or with other adjacent electronic devices. In this regard, conducted EMI radiation at any of nodes 225A-C and 230A-B will typically be well below 1 dBV above 150 kHz and below 1 dBmV above 20 MHz.

Power converter module 200 further includes a power converter 245 that converts input 215 into an output having modified electrical characteristics, e.g., characteristics consistent with a single phase AC output 205. More particularly, as discussed in connection with FIG. 1 above, power converter module 200 may be used to convert a variety of inputs into a variety of outputs, as desired. One implementation of power converter 245 includes a DC bus 255 and a switching network 260 that convert input 215 into an output current and voltage having different form, e.g., a single phase AC output making up one phase of a multiphase AC output or a DC output of a different form than input 215. DC bus 255 is connected to input nodes 225A-C to receive input 215 and distribute it to switching network 260. Switching network 260 includes an internal switching circuitry, described in more detail in connection with FIGS. 3, 4 and 5 below, that is configured to generate a converted output.

The output from switching network 260 is provided to series impedance network 265. The latter includes one or more inductors (not shown in FIGS. 2A and 2B) that serve as part of ripple filter 235 and EMI filter 240 and limit current ripple in these filters. The output from series impedance network 265 is provided to node 230B and ripple filter 235.

As indicated in FIG. 2A, ripple filter 235, EMI filter 240 and series impedance network 265 are for most applications, although not necessarily, positioned inside enclosure 220. This is in contrast to known modular power converters in which essentially just the elements of power converter 245 are positioned inside an enclosure. Accordingly, known modular power converters and associated inductors, filters and other components, as an entire assembly, generate substantial conducted and radiated electromagnetic energy. Developing the associated filtering necessary to control EMI in known modular power converters to appropriate levels typically requires custom engineering services, which precludes the use of "plug and play" functionality as is achieved with the power converter modules of the present disclosure.

In view of the foregoing, it is contemplated that a power converter module 200 in accordance with concepts of the present invention may also include internal circuitry in accordance with concepts discussed in U.S. patent application Ser. No. 11/850,103 ("the '103 application"), which is incorporated by reference herein in its entirety. The '103 application discloses, among other things, several exemplary configurations of power converters that may be used in power converter module 200. In this connection, FIGS. 1-4 illustrate, respectively, a buck converter circuit, a boost converter circuit, a half-bridge circuit, and an alternative buck converter circuit that are configured in a manner in which they can be incorporated into certain implementations of a power converter module 200 for use alone or in multiphase power converter 100 (FIG. 1). As such, these Figures, and the associated disclosure in the specification, is specifically incorporated herein by reference. Further, converter cells of the type illustrated in FIGS. 5A, 6A, 7A, 8, 9A, 10A and described in associated text in the specification of the '103 application, including associated timing diagrams, may be used in whole or in part in certain implementations of power converter 200. These Figures, and the associated disclosure in the specification is also specifically incorporated herein by reference. These specific incorporations by reference are not intended to limit incorporation by reference of other aspects of the '103 application, which, as noted above, is incorporated herein in its entirety.

Referring again to FIGS. 2A and 2B, power converter module 200 also includes a control interface 270 that is involved in controlling and protecting the operation of the module. In some implementations, control interface 270 also provides control information to separate control system 105 which is used by such control system in controlling the operation of the power converter module 200. In other implementations, power converter module 200 is controlled by control interface 270 alone. Control interface 270 is connected to sense input voltage received at nodes 225A and 225B and to sense output current and voltage from series impedance network 265. This current and voltage information received by control interface 270 is used in connection with controlling the operation of power converter module 200 and may be provided as control information to control system 105, when used in power conversion network 100. Power converter module 200 may include various sensors (not shown) for monitoring the operating state (e.g., temperature) and condition of various elements of the module, with the output of such sensors being provided to control interface 270 for use in controlling the operation of the power converter module. More particularly, the output from various sensors in power converter module 200 may be used by control interface 270 in connection with instantaneous current, voltage and temperature shut-down and latching. In this regard, problems in the software of control system 105 that could result in power converter module 200 operating in a manner that could harm the module will be addressed by the shut-down and latching protection afforded by control interface 270.

In an alternative implementation of power converter module 200, control interface 270 optionally includes a memory 290 that permits storage of information with respect to the design and operational history of power converter module 200. Memory 290, for instance, may be a non-volatile memory or other stable storage device (e.g., a memory card, floppy drive, flash memory) in communication with other aspects of control interface 270. It is contemplated, for example, that memory 290 may include a counter for operation hours, maintenance history and identification information, e.g., serial number. By providing identifying information specific to the individual power converter module 200, other power modules having similar functionality can be easily substituted without the need for detailed power engineering design and analysis services.

Discussing in more detail the interrelationship between control system 105 and control interface 270, the control system provides signal processing control for power conversion system 100. This signal processing control includes switch pattern generation, current regulation and voltage regulation. This control is accomplished using information sensed in power converter module 200 and provided to control system 105 via control interface 270. Control system 105 also functions as a communications interface with the "outside world" through standard communication protocols, e.g., Ethernet or RS 232, or, if desired, proprietary communication protocols.

Figure 3:
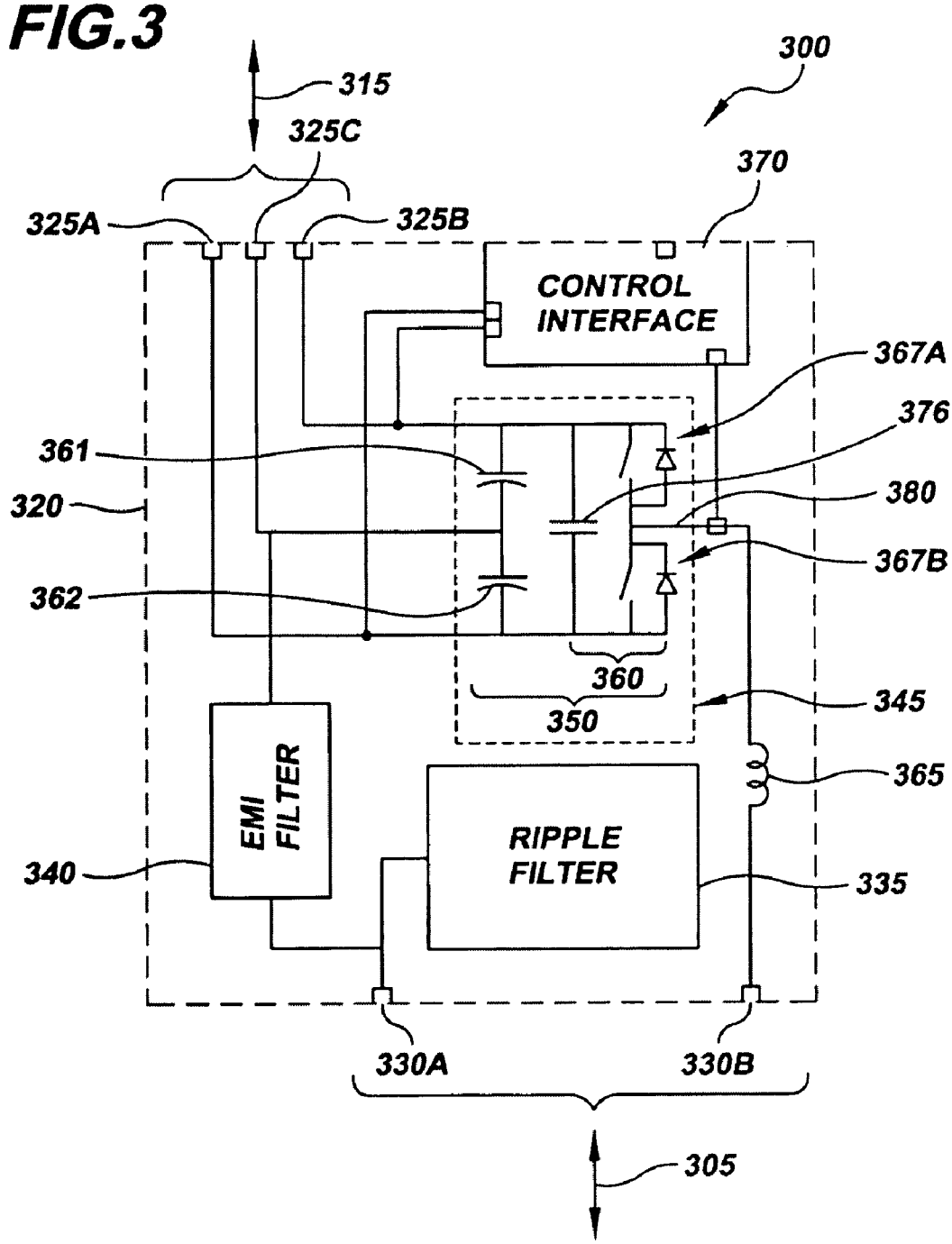
FIG. 3 is a schematic diagram of a power converter module similar to the one shown in FIG. 2A, except that the circuitry used in the DC bus and switching network is illustrated.

FIG. 3 illustrates a power converter module 300 in accordance with concepts of the present invention for use alone or in multiphase power converter 110. Power converter module 300 is similar to power module 200, except that the details of one circuit implementation of power converter 245 are illustrated. Power converter module 300 includes an enclosure 320 that surrounds internal circuitry in a manner that permits the power module to limit radiation of electromagnetic energy, as discussed above with respect to other embodiments of the power converter module. Power converter module 300 further includes input nodes 325A-C, output nodes 330A and B, ripple filter 335, EMI filter 340, power converter 345, an inductor 365, and control interface 370, each of which are similar to corresponding structures described above with respect to other embodiments of the power converter modules. Power converter module 300 generates a single phase output 305 in a manner similar to that described in connection with FIGS. 2A and 2B, above.

More particularly, power converter 345 is connected to input nodes 325A-C, and includes a power circuit 350 in the form of a half-bridge converter. Power circuit 350 includes a single power converter cell 360 and two series-connected DC bus capacitors 361 and 362. Power converter cell 360 includes two series-connected power switches 367A-B. Power switches 367A-B are connected in parallel with DC bus capacitors 361, 362 and with snubber capacitor 376. Devices used for switches 367A-B may include IGBTs, MOSFETs, Bipolar transistors, GTOs, MCTs, and other power switches that can be turned on and off quickly and relatively easily with minimal power loss and reliability. In the implementation illustrated in FIG. 3, power converter cell 360 includes a pair of IGBT semiconductor devices that are used to generate a converted single-phase output provided on line 380 to inductor 365. For convenience of illustration, wiring that carries control information from interface circuit 370 to switches 367A-B is not illustrated.

Figure 4:
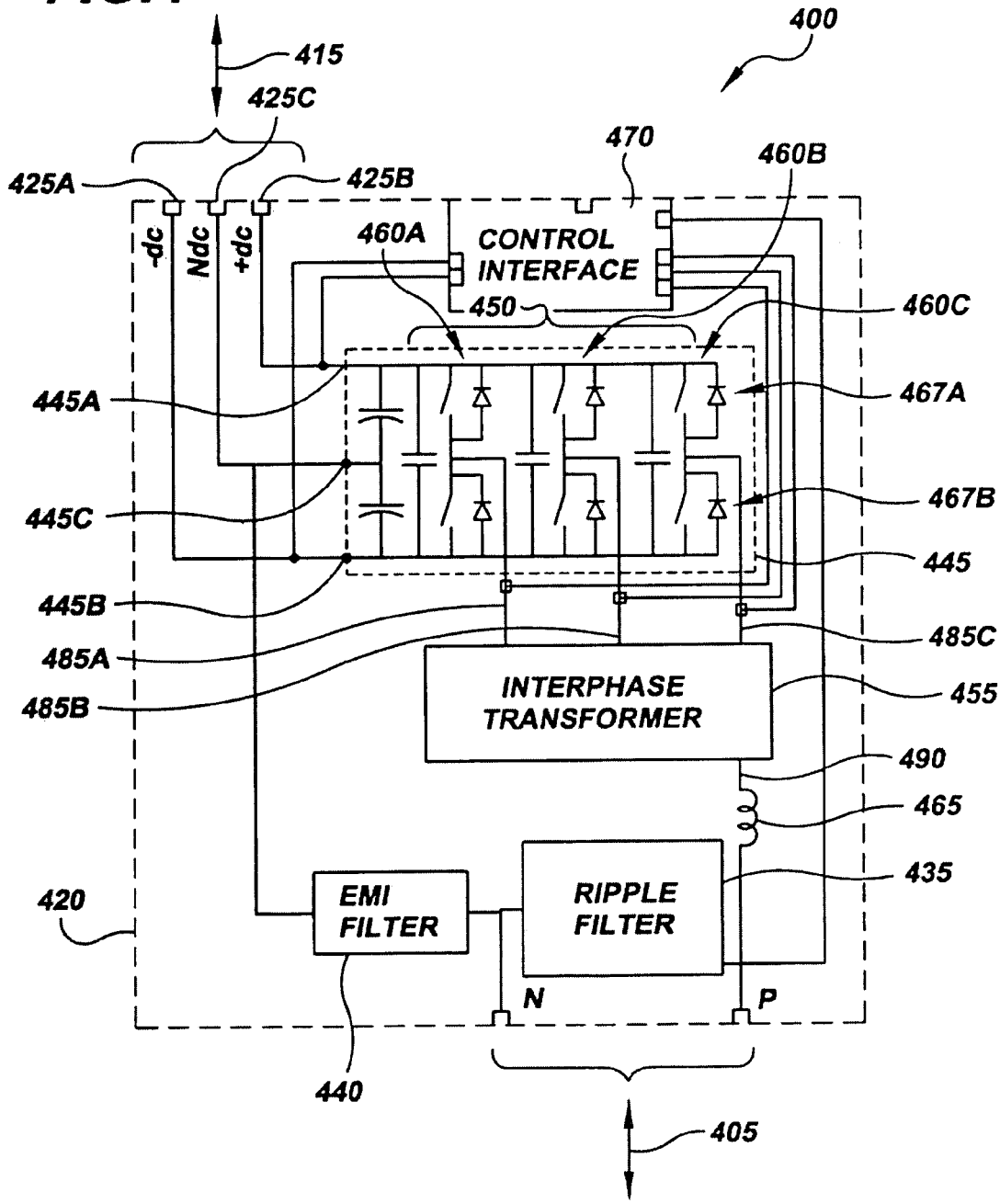
FIG. 4 is a schematic diagram of another power converter module similar to the one shown in FIG. 2A, except that the circuitry used in the DC bus and switching network is illustrated.

FIG. 4 illustrates a power converter module 400 in accordance with concepts of the present invention that is structurally similar to power module 300 (FIG. 3), described in detail above. Here, power converter module 400 generates a single phase output 405 from input 415. Like power module 200, 300 discussed above, power module 400 includes an enclosure 420 that surrounds a ripple filter 435, an EMI filter 440, a power converter 445, an interphase transformer 455, an inductor 465 and a control interface 470, all of which are configured to generate single-phase output 405.

The internal circuitry of power converter 445 is different from the internal circuitry of power converter 345 (FIG. 3) described above. Here, power converter 445 is connected to nodes 445A-C, and includes a power converter circuit 450 in the form of a three-cell half-bridge converter. Power converter circuit 450 includes three power converter cells 460A-C that each include two power switches 467A-B. Each power converter cell 460A-C generates a converted output on lines 485A-C from input 415. In the present example, each converted signal on lines 485A-C is consistent with a single phase of an AC signal. Unlike power converter 300 (FIG. 3) that transmits a single converted signal directly to the inductor, this power converter transmits converted signals on lines 485A-C to interphase transformer 455. Generally, interphase transformer 455 (or, alternatively known as an interphase reactor) and similar devices are known in the art as being configured to generate a single phase of an output signal in response to multiple inputs. Suitable designs for interphase transformers 455 are described in the '103 application. Here, interphase transformer 455 generates a transformed output on line 490 in response to converted input on lines 485A-C. Transformed signal on line 490, having a single phase of an AC signal, is transmitted to the load (not shown) via inductor 465.

Figure 5:
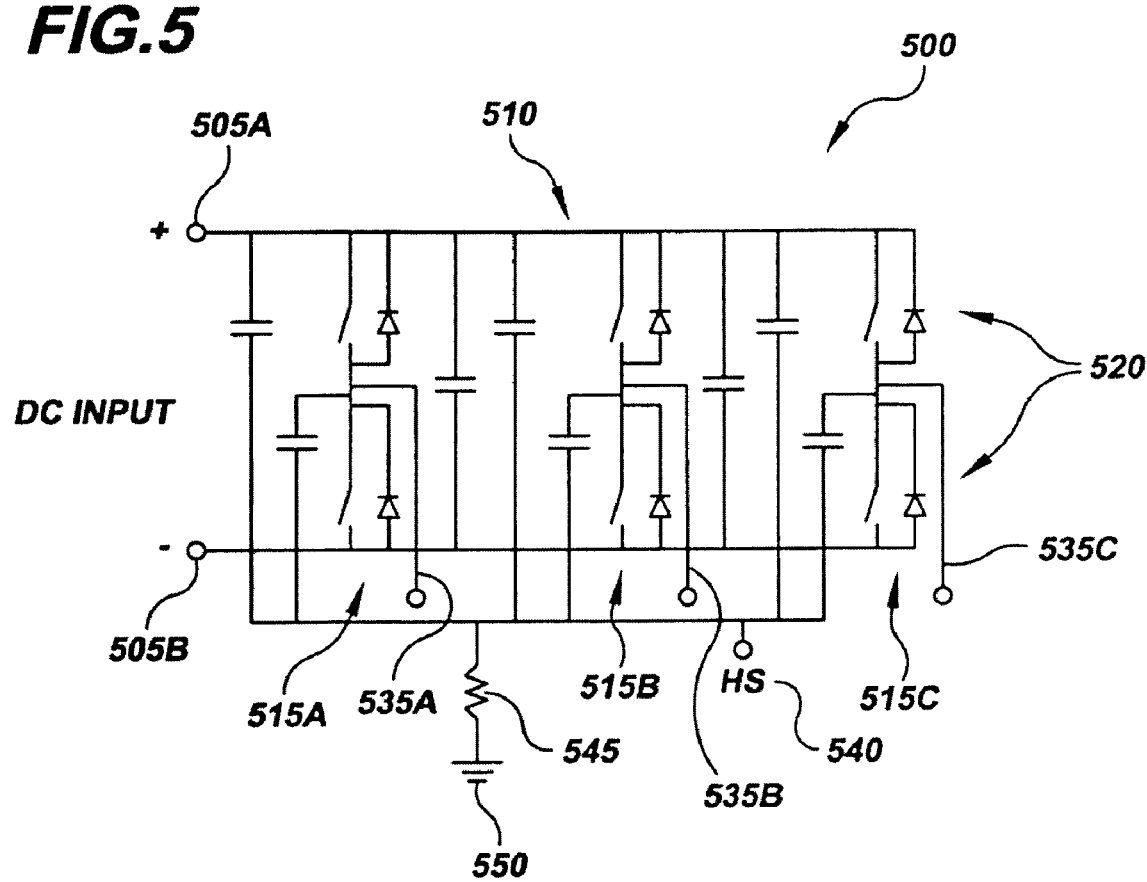
FIG. 5 is a schematic diagram of a switching network for use in a power converter module, such as the power modules of FIGS. 2A, 2B, 3, and 4.

FIG. 5 is a power semiconductor module 500 that can be used alone or with a power module in accordance with concepts of the present invention, such as power modules 200, 300, 400. Power semiconductor module 500 includes input nodes 505A-B and a power converter circuit 510. It is noted that power converter circuit 510 includes three power converter cells 515A-C that each include two power switches 520, the combination of which permits each power converter cell 515A-C to generate a converted signal on lines 535A-C.

Unlike the examples of the power converters above, power semiconductor module 500 also includes a heat sink 540 in communication with a resistance 545 that is connected to a ground 550. By contrast, it is believed that known power semiconductor heat sinks are always connected directly to ground without use of a resistance. The concept of connecting a power semiconductor heat sink to ground via a resistance is not limited to power semiconductor modules of the type described herein. This feature is more generally applicable to power converters of any type.

Generally, it will be recognized by power electronics engineers that the power converter module 500 illustrated in FIG. 5 shows each switch 520A-C mounted to a single heat sink. It is contemplated, however, that each switch 520A-C can be mounted to a corresponding individual heat sink (not shown), or to other devices or in other configurations that dissipate heat from the switch. When multiple heat sinks 540 are utilized, each heat sink could include a resistance to ground, or, alternatively, all of the heat sinks may be in communication with a single resistance to ground.

As discussed more below, a power converter module that includes a heat sink connected through a resistance to ground will improve EMI filter performance. It will be recognized by those skilled in the art, for instance, that the coupling capacitance between the switches and the heat sink is a source of common mode noise. For example, when the switches switch, the large pulses of current that flow through the coupling capacitance between the semiconductor switches and the heat sink go to ground, which cause fast current rise times in the system level ground. Typically the noise caused by this current rise is filtered through various configurations of inductors and shunted to ground by capacitors found in the power converter or associated EMI filter.

It is contemplated that connecting the heat sink to ground through a resistance lowers the high frequency energy observed by the EMI filter by limiting the current in these pulses and spreading it over time. In one implementation, the resistance is equal to about the characteristic impedance of the parallel resonance between a series filter inductance and the heat sink-to-substrate capacitance of the switch assembly. In alternative implementations, the resistance may vary in accordance with:

$$R = \sqrt{\frac{L}{C}} + /-50\%. \qquad \text{Equation 1}$$

where R is the resistance, L is the parallel combination of series inductors, and C is the total capacitance of the circuit to the heat sink. In still other implementations that include multiple heat sinks, as mentioned above, L is the inductance associated with each corresponding heat sink and C is the capacitance associated with that corresponding heat sink.

Figure 6:
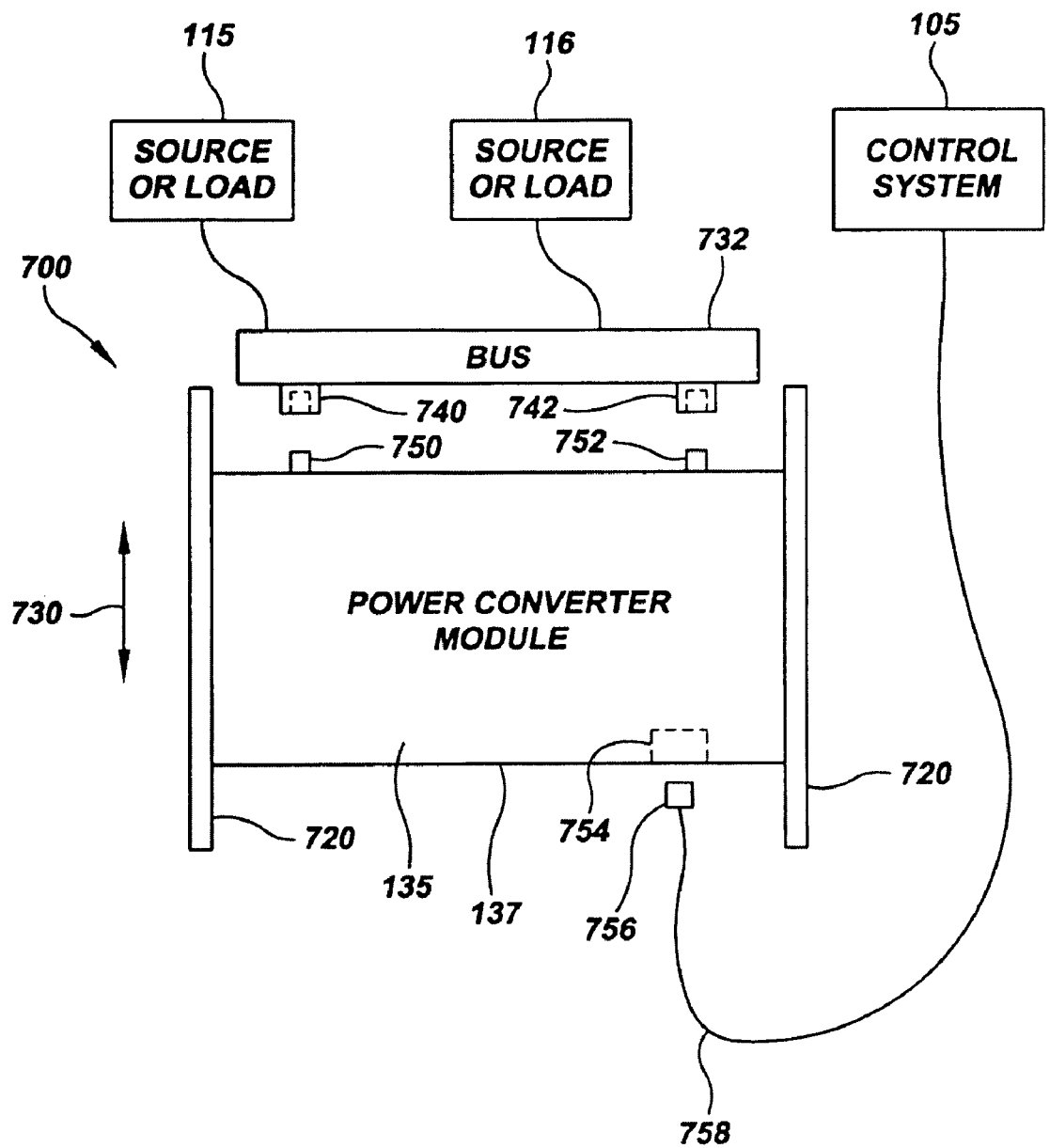
FIG. 6 is a schematic diagram of a slide assembly, electrical connectors and other structure that may be used to support a power converter module and permit ready connection and disconnection from input and output current/voltage and to a control system.

Referring now to FIGS. 1 and 6, in addition to the various electrical components of power converter modules 135, 200, 202, 300, 400 and 500 that are designed and configured to support modularity, the power converter modules may also include mechanical aspects that permit quick and easy replacement of one power converter module with another. Although the following discussion of these mechanical aspects concerns power converter module 135 for convenience, it is to be appreciated that it applies equally to the other power modules encompassed by the present disclosure.

Power converter module 135 may be advantageously mounted on a slide assembly 700 that permits the module to be easily installed and removed. Slide assembly 700 may include, for example a pair of tracks 720 and power converter module 135 may include associated rollers or other structure (not shown) that co-acts with tracks 720 so as to allow power converter module 135 to be moved back and forth along the tracks as indicated by arrow 730 relative to bus 732. The latter is connected to source or load 115 and source or load 116 and conducts input and output current and voltage to and from power converter module 135, when attached as described below. In this regard, bus 732 functions as both an electrical bus for carrying input and output current and voltage and as a mechanical back plane for receiving power converter module 135, also as described more below. Bus 732 further includes electrical connectors 740 and 742. Electrical connector 740 is connected to source or load 115 and electrical connector 742 is connected to source or load 116. Electrical connectors 740 and 742 are positioned in a predetermined position on bus 732, as discussed more below.

Power converter module 135 includes an enclosure 137 of the type described above with respect to other implementations of the power converter module, e.g., enclosure 220 of power converter module 200. Power converter module 135 also includes electrical connectors 750 and 752 which are generally, but not necessarily positioned inside enclosure 137. Electrical connectors 750 and 752 are positioned on power converter module 135 so that when the module is supported on slide assembly 700 and moved toward bus 732, electrical connector 750 is aligned with and may be connected to electrical connector 740, and electrical connector 752 is aligned with and may be connected to electrical connector 742. Further, electrical connectors 740 and 750 and electrical connectors 742 and 752 are designed to connect with one another so that when power converter module 135 is moved along slide assembly 700 electrical connection is automatically achieved by urging the connector pairs into engagement with one another. This "plug and play" arrangement facilitates quick connection of power converter module 135 to bus 732 and ultimately to current/voltage inputs and outputs from source/load 115 and source/load 116.

Power converter module 135 further includes another connector 754, also in many, but not necessarily all, cases positioned inside enclosure 137. This connector is provided to allow quick connection between control system 105 and power converter module 135, and is accomplished with electrical connector 756 that is connected by cable 758 to control system 105. Quick release connections (not shown) to sources of air and/or water may also be provided on module 135.

The nature of the modular design of power converter modules 135, 200, 202, 300, 400 and 500 provides a number of benefits. These benefits include permitting the power converter modules to be quickly and easily installed and removed, minimizing conducted and radiated interference, e.g., electromagnetic interference (EMI) and ripple interference, and minimizing the extent of custom engineering services required in connection with use of the modules, among others.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A power converter module usable with a control system, the power converter module comprising:
   a power converter for converting an input into an output having a single phase;
   a control interface connected to said power converter and configured for connection to the control system;
   a first filter for filtering out first components from said output;
   a second filter for filtering out second components from said output, wherein said second filter is an EMI filter for filtering components of said output that may create electromagnetic interference;
   a negative input, a positive input and a neutral input, and a neutral output and a phase output, wherein said EMI filter includes a first EMI filter connected to said neutral input and said neutral output and a second EMI filter connected to said positive input and said neutral output; and
   an enclosure surrounding said power converter, said control interface, said first filter and said second filter.

2. A power converter module according to claim 1, wherein the output is one phase of a three-phase alternating current.

3. A power converter module according to claim 1, further including input nodes for receiving said input and output nodes for providing said output, wherein conducted electromagnetic radiation as measured at said input nodes and said output nodes is below 1 dB volts above 150 kHz and below 1 dB millivolts above 20 MHz.

4. A power converter module according to claim 1, wherein said power converter module includes a DC bus, a switching network and a series impedance network.

5. A power converter module according to claim 1, wherein said first filter is a ripple filter for filtering frequencies in the range of 1 kHz to 100 kHz.

6. A power converter module according to claim 1, wherein said control interface communicates with the control system in a manner permitting the power converter module to operate with other power converter modules so as to produce an output having a plurality of phases, including said single phase.

7. A power converter module according to claim 1, further including a switching network that has one or more heat sinks in communication with a ground via a resistance.

8. A power converter module according to claim 7, wherein said resistance has a resistance value of:

$$R = \sqrt{\frac{L}{C}} + /-50\%,$$

wherein R is resistance value, L is the inductance associated with said heat sinks and C is the total capacitance of said heat sink.

9. A power converter module usable with a control system, the power converter module comprising:
   a power converter for converting an input into an output having a single phase;
   a control interface connected to said power converter and configured for connection to the control system;
   a first filter for filtering out first components from said output;
   a second filter for filtering out second components from said output; and
   an enclosure surrounding said power converter, said control interface, said first filter and said second filter, wherein said enclosure does not enclose the control system when connected with the control interface.

10. A power converter module according to claim 9, wherein the output is one phase of a three-phase alternating current.

11. A power converter module according to claim 9, further including input nodes for receiving said input and output nodes for providing said output, wherein conducted electromagnetic radiation as measured at said input nodes and said output nodes is below 1 dB volts above 150 kHz and below 1 dB millivolts above 20 MHz.

12. A power converter module according to claim 9, wherein said power converter module includes a DC bus, a switching network and a series impedance network.

13. A power converter module according to claim 9, wherein said first filter is a ripple filter for filtering frequencies in the range of 1 kHz to 100 kHz.

14. A power converter module according to claim 9, wherein said control interface communicates with the control system in a manner permitting the power converter module to operate with other power converter modules so as to produce an output having a plurality of phases, including said single phase.

15. A power converter module according to claim 9, wherein said second filter is an EMI filter for filtering components of said output that may create electromagnetic interference.

16. A power converter module according to claim 15, further including a switching network that has one or more heat sinks in communication with a ground via a resistance, wherein said resistance has a resistance value of:

$$R = \sqrt{\frac{L}{C}} + /-50\%,$$

wherein R is resistance value, L is the inductance associated with said heat sinks and C is the total capacitance of said heat sink.

17. A power converter module usable with a control system, the power converter module comprising:
a power converter for converting an input into an output having a single phase;
a control interface connected to said power converter and configured for connection to the control system;
a first filter for filtering out first components from said output;
a second filter for filtering out second components from said output, wherein said second filter is an EMI filter for filtering components of said output that may create electromagnetic interference input and said neutral output;
a switching network that has one or more heat sinks in communication with a ground via a resistance; and
an enclosure surrounding said power converter, said control interface, said first filter and said second filter, wherein the enclosure does not enclose the control system when connected to the control interface.

18. A power converter module according to claim 17, further including a negative input, a positive input and a neutral input, and a neutral output and a phase output, wherein said EMI filter includes a first EMI filter connected to said neutral input and said neutral output and a second EMI filter connected to said positive input and said neutral output.

* * * * *

UNITED STATES PATENT AND TRADEMARK OFFICE
CERTIFICATE OF CORRECTION

PATENT NO. : 8,059,436 B2
APPLICATION NO. : 11/952805
DATED : November 15, 2011
INVENTOR(S) : Badger et al.

Page 1 of 1

It is certified that error appears in the above-identified patent and that said Letters Patent is hereby corrected as shown below:

In column 10, claim 1, line 7, delete "neutral" and insert --negative-- therefor.

Signed and Sealed this
Twelfth Day of February, 2013

Teresa Stanek Rea
*Acting Director of the United States Patent and Trademark Office*

UNITED STATES PATENT AND TRADEMARK OFFICE
CERTIFICATE OF CORRECTION

| | |
|---|---|
| PATENT NO. | : 8,059,436 B2 |
| APPLICATION NO. | : 11/952805 |
| DATED | : November 15, 2011 |
| INVENTOR(S) | : Badger et al. |

Page 1 of 1

It is certified that error appears in the above-identified patent and that said Letters Patent is hereby corrected as shown below:

In the Claims:

In column 12, claim 18, line 25, delete "neutral" and insert --negative-- therefor.

Signed and Sealed this
Ninth Day of July, 2013

Teresa Stanek Rea
*Acting Director of the United States Patent and Trademark Office*